United States Patent [19]

Schmolka

[11] 3,925,241

[45] *Dec. 9, 1975

[54] AMPHOTERIC SURFACTANT GELS

[75] Inventor: Irving R. Schmolka, Grosse Ile, Mich.

[73] Assignee: BASF Wyandotte Corporation, Wyandotte, Mich.

[ * ] Notice: The portion of the term of this patent subsequent to June 19, 1990, has been disclaimed.

[22] Filed: Feb. 26, 1973

[21] Appl. No.: 320,516

Related U.S. Application Data

[63] Continuation-in-part of Ser. No. 580,204, Sept. 19, 1966, Pat. No. 3,740,421.

[52] U.S. Cl. ............... 252/316; 252/106; 252/542; 252/545; 252/546; 252/DIG. 1; 252/DIG. 7; 252/DIG. 13; 424/70; 424/78
[51] Int. Cl.$^2$ .......................................... B01J 13/00
[58] Field of Search ......... 424/65, 70, 78, 341, 342, 424/345; 252/316, DIG. 1, DIG. 13

[56] References Cited

UNITED STATES PATENTS

| | | | |
|---|---|---|---|
| 2,674,619 | 4/1954 | Lundsted | 260/485 |
| 3,036,118 | 5/1962 | Jackson et al. | 260/615 B X |
| 3,042,631 | 7/1962 | Strandskov | 260/615 B X |
| 3,156,656 | 11/1964 | Libby | 252/542 |
| 3,304,262 | 2/1967 | Corey | 252/316 X |
| 3,328,436 | 6/1967 | Erlemann et al. | 252/316 X |
| 3,740,421 | 6/1973 | Schmolka | 252/316 X |

FOREIGN PATENTS OR APPLICATIONS

| | | | |
|---|---|---|---|
| 784,659 | 10/1957 | United Kingdom | 424/78 |

*Primary Examiner*—Richard D. Lovering
*Attorney, Agent, or Firm*—Joseph D. Michaels; Bernhard R. Swick; Robert E. Dunn

[57] ABSTRACT

Amphoteric surfactant gels useful as hair shampoos, hand and facial cleansers are prepared from certain polyoxypropylene polyoxyethylene block copolymers as gelling agents.

7 Claims, No Drawings

AMPHOTERIC SURFACTANT GELS

This application is a continuation-in-part of copending U.S. patent application Ser. No. 580,204, filed Sept. 19, 1966, now U.S. Pat. No. 3,740,421.

BACKGROUND OF THE INVENTION

1. Field of the Invention

The present invention relates to amphoteric surfactant gels. More specifically, the present invention relates to aqueous amphoteric surfactant gels prepared from certain polyoxyethylene polyoxypropylene block copolymers.

2. Prior Art

Various detergent compositions and their methods of preparation for use as hair shampoos, facial and hand cleansers and other cosmetic uses are described in the prior art. There are also various gel formulations described. For example, U.S. Pat. Nos. 3,639,574 and 3,639,575 disclose gels incorporating hydrogen peroxide and silver ions respectively. The prior art, however, is silent on the preparation of stable gels incorporating amphoteric surfactants.

Amphoteric surfactants are known to have outstanding advantages for their mildness to skin and eyes. They have high foaming power with excellent detergency in hard water. Some have germicidal, fungicidal and deodorizing power. All of these properties are desirable for use as shampoos, facial and hand cleansers, eye make-up removers, and other cosmetic uses. Amphoteric surfactants are also useful in formulating pet shampoos, as surgical hand soaps, for food peeling, bottle washing, various household cleaning uses such as rug and upholstery cleaning, dishwashing, automobile washing, etc. In addition, they may be formulated for use as metal cleaners and brighteners, wax strippers and degreasers.

For convenience it is desirable to prepare these amphoteric surfactants in gel form. Previous experience with amphoteric surfactants has shown that gels could not be formed. Thus it was surprising and unexpected to be able to form gels using certain polyoxyethylene polyoxypropylene block copolymers as the gelling agents.

SUMMARY OF THE INVENTION

It has now been discovered that it is possible to prepare stable gels incorporating amphoteric surfactants by heating certain block copolymers and amphoteric surfactants to a temperature between 140° F. – 196° F. and with mixing slowly adding water to the solution. The solution is then allowed to cool to room temperature whereby a ringing gel is formed. Alternatively, the amphoteric surfactant may be added to a solution of water and block copolymer which solution is at a temperature of 40° F. – 50° F. while mixing the solution. The solution is then allowed to warm to room temperature resulting in a ringing gel.

DESCRIPTION OF THE PREFERRED EMBODIMENTS

As used herein, the term "gel" is defined as a solid or semisolid colloid containing considerable quantities of water. The particles in a gel are linked in a coherent meshwork which immobilizes the water. A colloidal solution with water as the dispersion medium is called, more specifically, a "hydrosol." The gels within the scope of the present invention are more specifically "ringing" gels and may be described as gels that have a firm jelly-like consistency; that is, by tapping the gel lightly it will vibrate and return to its original configuration.

The gels of the present invention comprise, based on a total of 100 parts by weight, (a) from about 5 parts to 50 parts, preferably from 10 parts to 40 parts, of amphoteric surfactant, (b) from about 10 parts to about 80 parts, preferably from 30 parts to 70 parts, of water, and (c) from about 15 parts to 40 parts, preferably from 20 parts to 30 parts, of a polyoxyethylene polyoxypropylene block copolymer. The polyoxyethylene polyoxypropylene block copolymers which may be employed in the preparation of the gels of the present invention may be represented by the formula:

(I) $HO(C_2H_4O)_b(C_3H_6O)_a(C_2H_4O)_bH$ wherein a is an integer such that the hydrophobe portion represented by $(C_3H_6O)$ has a molecular weight of at least 2250, preferably from 2,750 to 4,000, and b is an integer of from 16 to 360.5 such that the hydrophile portion represented by $(C_2H_4O)$ constitutes from about 10 to 90, preferably from 50 to 90 weight percent of the copolymer with the provisos that:

1. when a is an integer such that the average molecular weight of the hydrophobe is about 2,250, then the total moles of ethylene oxide is from about 52 to 193.2, and the total average molecular weight of the block copolymer is from 4,600 to 10,750;
2. when a is an integer such that the average molecular weight of the hydrophobe is about 2,750, then the total moles of ethylene oxide is from about 48 to 244.2, and the total average molecular weight of the block copolymer is about 4,910 to 13,500;
3. when a is an integer such that the average molecular weight of the hydrophobe is about 3,250, then the total moles of ethylene oxide is from about 36 to 279.6, and the total average molecular weight of the block copolymer is from about 4,910 to 15,500;
4. when a is an integer such that the average molecular weight of the hydrophobe is about 4,000, then the total moles of ethylene oxide is from about 48 to 360.5, and the total average molecular weight of the block copolymer is from 6,150 to 20,000.

The hydrophobe portion of the polyoxyethylene polyoxypropylene block copolymers of formula (I) above is prepared by adding propylene oxide to the two hydroxyl groups of a propylene glycol nucleus. By adding ethylene oxide to the hydrophobe portion it is possible to put polyoxyethylene hydrophilic groups on both ends of the molecule. These hydrophilic polyoxyethylene groups may be controlled to constitute anywhere from 10 percent to 90 percent of the final molecule. A more detailed explanation of the preparation of these block copolymers may be found in U.S. Pat. NO. 2,674,619.

Illustrative block copolymers of formula (I) above which may be employed in the preparation of the gels of the present invention are presented in Table I.

TABLE I

| Copolymer | Mol. Wt. of Hydrophobe (average) | Wt. % of Hydrophile (average) | Approx. Total Mol. Wt. of Copolymer |
|---|---|---|---|
| A | 2,250 | 50 | 4,600 |
| B | 2,250 | 70 | 7,500 |
| C | 2,250 | 80 | 10,750 |
| D | 2,750 | 45 | 4,910 |
| E | 2,750 | 60 | 6,450 |

TABLE I-continued

| Copolymer | Mol. Wt. of Hydrophobe (average) | Wt. % of Hydrophile (average) | Approx. Total Mol. Wt. of Copolymer |
|---|---|---|---|
| F | 2,750 | 80 | 13,500 |
| G | 3,250 | 35 | 4,910 |
| H | 3,250 | 45 | 6,050 |
| J | 3,250 | 50 | 6,550 |
| K | 3,250 | 80 | 15,500 |
| L | 4,000 | 15 | 4,710 |
| M | 4,000 | 25 | 5,340 |
| N | 4,000 | 35 | 6,150 |
| P | 4,000 | 70 | 13,500 |
| Q | 4,000 | 80 | 20,000 |

Not all of the block copolymers of the formula (1) $HO(C_2H_4O)_b(C_3H_6O)_a(C_2H_4O)_bH$ 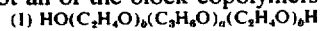

may be employed in the present invention. Because of the nature of aqueous solutions of these block copolymers, three variables effect the formation of the gels. Therefore, it is necessary to recognize certain minimums for the three variables. These variables are:

1. the weight percent concentration of block copolymers in the gel,
2. the molecular weight of the hydrophobe portion $(C_3H_6O)_a$, and
3. the weight percent of the hydrophile portion $(C_2H_4O)_b$ of the copolymer.

These minimums define a minimum weight percent concentration of the block copolymer with a specific molecular weight polyoxypropylene hydrophobe portion having a minimum weight-percent of ethylene oxide condensed thereto necessary to form the gels. Thus, at the minimum concentration with a specific molecular weight hydrophobe portion, a minimum weight percent of ethylene oxide is required before a specific block copolymer will form a gel in an aqueous solution. The minimum weight percent concentrations with specific molecular weight hydrophobe portions are set out in Table II.

TABLE II

| Mol. Wt. of Hydrophobe Portion | Min. Weight % Concentration to Form a Gel | Min. Weight % of Ethylene Oxide Required | Total Mol. Wt. of Block Copolymer |
|---|---|---|---|
| 2,250 | 40 | 50 | 4,600 |
| 2,750 | 40 | 45 | 4,910 |
| 2,750 | 30 | 60 | 6,450 |
| 3,250 | 30 | 35 | 4,910 |
| 4,000 | 50 | 15 | 4,710 |
| 4,000 | 30 | 35 | 6,150 |
| 4,000 | 20 | 70 | 13,500 |

In interpreting Table II, it is apparent that at least a 40 percent weight concentration of the block copolymer having a hydrophobe portion of at least 2,250 molecular weight with at least about 50 weight percent of ethylene oxide condensed thereto will be necessary to form a gel in an aqueous solution. In all cases, the block copolymers above the minimums indicated in Table I will form gels in aqueous solutions up to 90 weight percent concentration and higher. Above 90 weight percent concentration, however, the gels tend to become indistinguishable from the starting block copolymer itself. It is to be understood that the molecular weight of the hydrophobe portion may be other than those illustrated in Table I. Thus, for example, if a hydrophobe portion of about 2,500 molecular weight is used, it is recognized that a gel may be formed from the block copolymer at a concentration of 40 weight percent in an aqueous solution where about 45 weight percent of ethylene oxide is present in the block copolymer.

The technical explanation for the formation of the gels of the invention is not entirely understood, and the explanation hereinafter is not to be considered as being limitative of the invention. However, the behavior of these block copolymers in forming the gels is believed to be explained on the basis of hydrate formation. It may be speculated that the hydrophobe, because it is different from the hydrophobe portion of other types of non-ionics, may, in its own right, immobilize the water independently of the oxyethylene chain by hydrogen bonding. It is noteworthy that gel formation occurs at about 70° F. to 80° F., even where the block copolymer contains more than 200 moles of ethylene oxide or over 100 moles per block. It is also believed that the nature of the block copolymer adds to this phenomena. It should be noted that the block copolymer used in the gels of this invention exhibits a hydrophobe portion lying between two equal hydrophile portions, whereas nonionics commonly encountered, such as the oxyethylated fatty alcohols and alkyl phenols, have only one hydrophile chain. This difference in structure suggests that a loose micellar structure is obtained with this class of nonionics and that gel formation would more readily involve entrapment of free water in addition to water due to hydrogen bonding.

The nature of these block copolymers, that is, their neutral nonionic nature, ensures that the full benefit of the use of the ionically balanced amphoteric surfactants can be realized. This results in a greater flexibility in formulating these gels for a greater variety of uses.

The amphoteric surfactants which are employed in the present invention are surface active agents containing both basic and acidic groups in the same molecule. These groups may be anionic or cationic and the molecule may contain several such groups. Examples of these amphoteric surfactants include the alkyl-substituted imidazolines such as: 2-alkyl-1-carboxymethyl-1-hydroxyethyl-2-imidazolinium hydroxide and 2-alkyl-1-carboxymethyl-1-carboxymethyl hydroxyethyl 1-alkyl sulfate imidazoline wherein the alkyl group may be derived from coconut, lauric, capric, caprylic, ethylhexoic, oleic, linoleic, or stearic acid; alkyl 3-aminopropionic acids wherein the alkyl group may be coconut, tallow or lauryl; the alkyl betaines wherein the alkyl groups may be coconut, tallow, stearyl or lauryl; fatty acid amide sulfonates wherein the fatty acid groups may be stearic, lauric, capric, oleic, caprylic, or linoleic; the alkyl β-aminopropionic acids wherein the alkyl grouping may be lauryl, myristyl, coconut, or stearyl; the amphoteric derivatives of polypeptides; and alkyl (ethylβoxipropanoic) imidazoline wherein the alkyl group may contain from 7 to 17 carbon atoms.

For convenience, the types of amphoteric surfactants as illustrated in the following examples are set out in Table III.

TABLE III

Amphoteric No. 1 — alkyl substituted imidazoline
Amphoteric No. 2 — fatty acid amide sulfonate
Amphoteric No. 3 — alkyl β-aminopropionic acid
Amphoteric No. 4 — alkyl betaine derived
Amphoteric No. 5 — alkyl β-oxipropanoic imidazoline In accordance with the present invention, the gel compositions are prepared by heating an amphoteric surfactant or mixtures of amphoteric surfactants together with certain block copolymers to a temperature between 140° F. – 196° F., and slowly adding water, with mixing, while maintaining the temperature. Upon allowing the solution to cool to room temperature a ringing gel is obtained.

In an alternate procedure the gel compositions are prepared by adding the amphoteric surfactant or mixtures thereof to a solution of water and block copolymer while maintaining the solution temperature at 40° F. – 50° F. Upon allowing the solution to warm to room temperature a ringing gel results.

Any of the conventional additives such as dyes, perfumes, and preservatives may also be added to the solution after adding the amphoteric surfactant and before allowing the solution to return to room temperature.

The following examples are presented to illustrate the invention. All parts are by weight. The copolymers employed are described in Table I.

EXAMPLE 1

This example illustrates the preparation of a type of facial cleanser.

Ten parts by weight of Amphoteric No. 1 with twenty parts by weight of copolymer P were heated to a temperature of 150° F. until the mixture was completely liquid and homogeneous. To this solution 70 parts by weight of water was slowly added, with mixing and maintaining the temperature at 150° F. The solution was then allowed to cool to room temperature whereby a ringing gel was formed.

EXAMPLE 2

Another type of facial cleanser was prepared by heating ten parts by weight of Amphoteric No. 1 with 22 parts by weight of copolymer P to a temperature of 160° F. until the mixture was completely liquid and homogeneous. To this solution 64 parts by weight of water, two parts by weight of propylene glycol and two parts by weight of ethoxylated lanolin were slowly added with mixing and maintaining the temperature at 160° F. The resulting solution was then allowed to cool to room temperature whereby a ringing gel was formed.

The following examples show the scope of the invention. All gels were prepared according to the procedure described in Example 1. In general, those gels which contain twenty or more parts of amphoteric surfactant would be useful as hair shampoos and rug and upholstery cleaners. The gels containing lesser quantities of amphoteric surfactants would be useful as facial and hand cleansers, eye make-up removers, for food peeling and other uses which do not require copious amounts of foam.

| EXAMPLE 3 | PARTS |
|---|---|
| Amphoteric No. 2 | 10 |
| Copolymer P | 22 |
| Water | 68 |
| EXAMPLE 4 | |
| Amphoteric No. 1 | 30 |
| Copolymer P | 26 |
| Water | 44 |
| EXAMPLE 5 | |
| Amphoteric No. 1 | 40 |
| Copolymer P | 30 |
| Water | 30 |
| EXAMPLE 6 | |
| Amphoteric No. 2 | 10 |
| Copolymer P | 22 |
| Water | 68 |
| EXAMPLE 7 | |
| Amphoteric No. 3 | 10 |

| -continued | |
|---|---|
| EXAMPLE 3 | PARTS |
| Copolymer P | 24 |
| Water | 66 |
| EXAMPLE 8 | |
| Amphoteric No. 4 | 40 |
| Copolymer P | 29 |
| Water | 31 |
| EXAMPLE 9 | |
| Amphoteric No. 5 | 38 |
| Copolymer P | 32 |
| Water | 30 |
| EXAMPLE 10 | |
| Amphoteric No. 1 | 10 |
| Copolymer K | 35 |
| Water | 55 |
| EXAMPLE 11 | |
| Amphoteric No. 1 | 10 |
| Copolymer F | 30 |
| Water | 60 |
| EXAMPLE 12 | |
| Amphoteric No. 1 | 40 |
| Copolymer P | 28 |
| Water | 32 |
| Bactericide, Perfume | q.s. |

The embodiments of the invention in which an exclusive property or privilege is claimed are defined as follows:

1. A stable gel comprising, based on a total of 100 parts by weight,
   a. from about 5 parts to about 50 parts of amphoteric surfactant
   b. from about 10 parts to about 80 parts of water
   c. from about 15 parts to about 40 parts of a copolymer having the formula: $HO(C_2H_4O)_b(C_3H_6O)_a(C_2H_4O)_bH$ wherein a is an integer such that the hydrophobe portion represented by $(C_3H_6O)$ has a molecular weight of from 2,250 to 4,000 and b is an integer of from 16 to 360.5 such that the hydrophile portion represented by $(C_2H_4O)$ constitutes from about 10 to 90 weight percent of the copolymer with the provisos that:
   1. when a is an integer such that the average molecular weight of the hydrophobe is about 2,250, then the total moles of ethylene oxide is from about 52 to 193.2, and the total average molecular weight of the block copolymer is from 4,600 to 10,750;
   2. when a is an integer such that the average molecular weight of the hydrophobe is about 2,750, then the total moles of ethylene oxide is from about 48 to 244.2, and the total average molecular weight of the block copolymer is about 4,910 to 13,500;
   3. when a is an integer such that the average molecular weight of the hydrophobe is about 3,250, then the total moles of ethylene oxide is from about 36 to 279.6, and the total average molecular weight of the block copolymer is from about 4,910 to 15,500;
   4. when a is an integer such that the average molecular weight of the hydrophobe is about 4,000, then the total moles of ethylene oxide is from about 48 to 360.5, and the total average molecular weight of the block copolymer is from 6,150 to 20,000.

2. The composition of claim 1 wherein the amphoteric surfactant comprises 10 to 40 parts per 100 parts of the gel.

3. The composition of claim 1 wherein the copolymer comprises 20 to 30 parts per 100 parts of the gel.

4. The composition of claim 1 wherein the water comprises 30 to 70 parts per 100 parts of the gel.

5. The composition of claim 1 wherein the polyoxyethylene polyoxypropylene block copolymer has an average molecular weight hydrophobe portion of from 2,750 to 4,000 and the hydrophile portion of the copolymer constitutes from 50 weight percent to 90 weight percent of the copolymer.

6. The composition of claim 1 wherein the copolymer has an average molecular weight hydrophobe portion of from 2,750 to 4,000.

7. The composition of claim 1 wherein the hydrophile portion of the copolymer constitutes from 50 weight percent to 90 weight percent of the copolymer.

* * * * *